C. HILL.
LEVEL.
APPLICATION FILED APR. 15, 1910.
1,032,904.
Patented July 16, 1912.
2 SHEETS—SHEET 2.
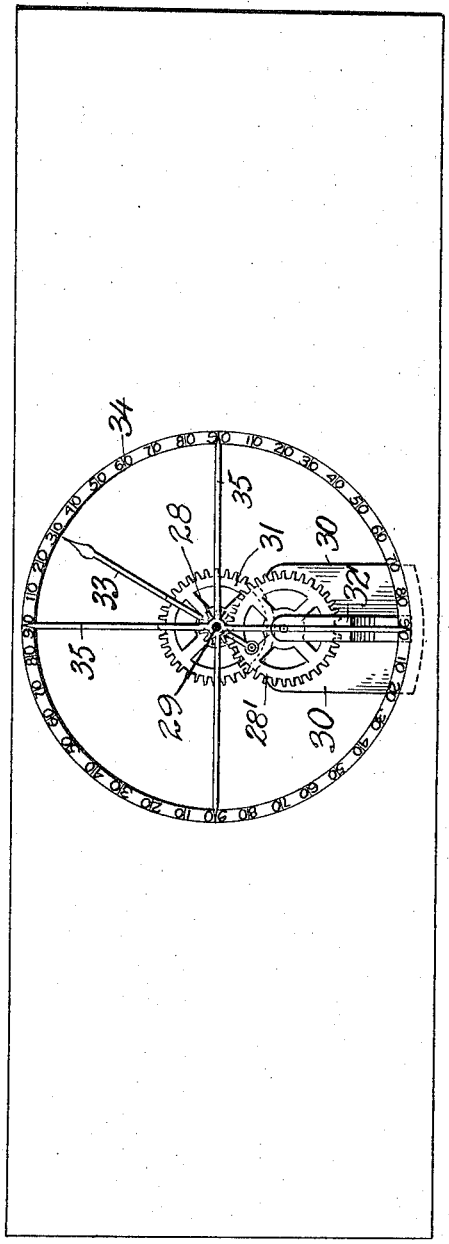
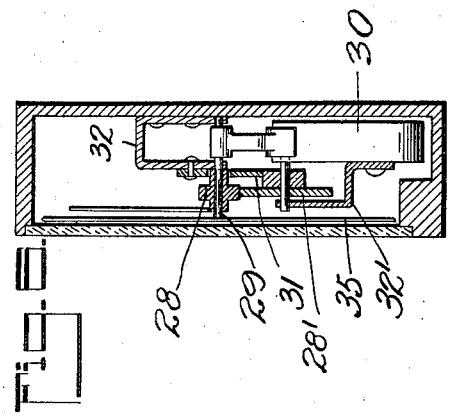
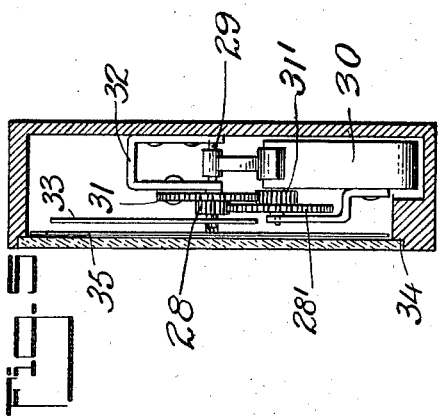
WITNESSES:
James P. Duhamel
W. S. McDowell
INVENTOR
Charles Hill,
BY
Victor J. Evans.
ATTORNEY

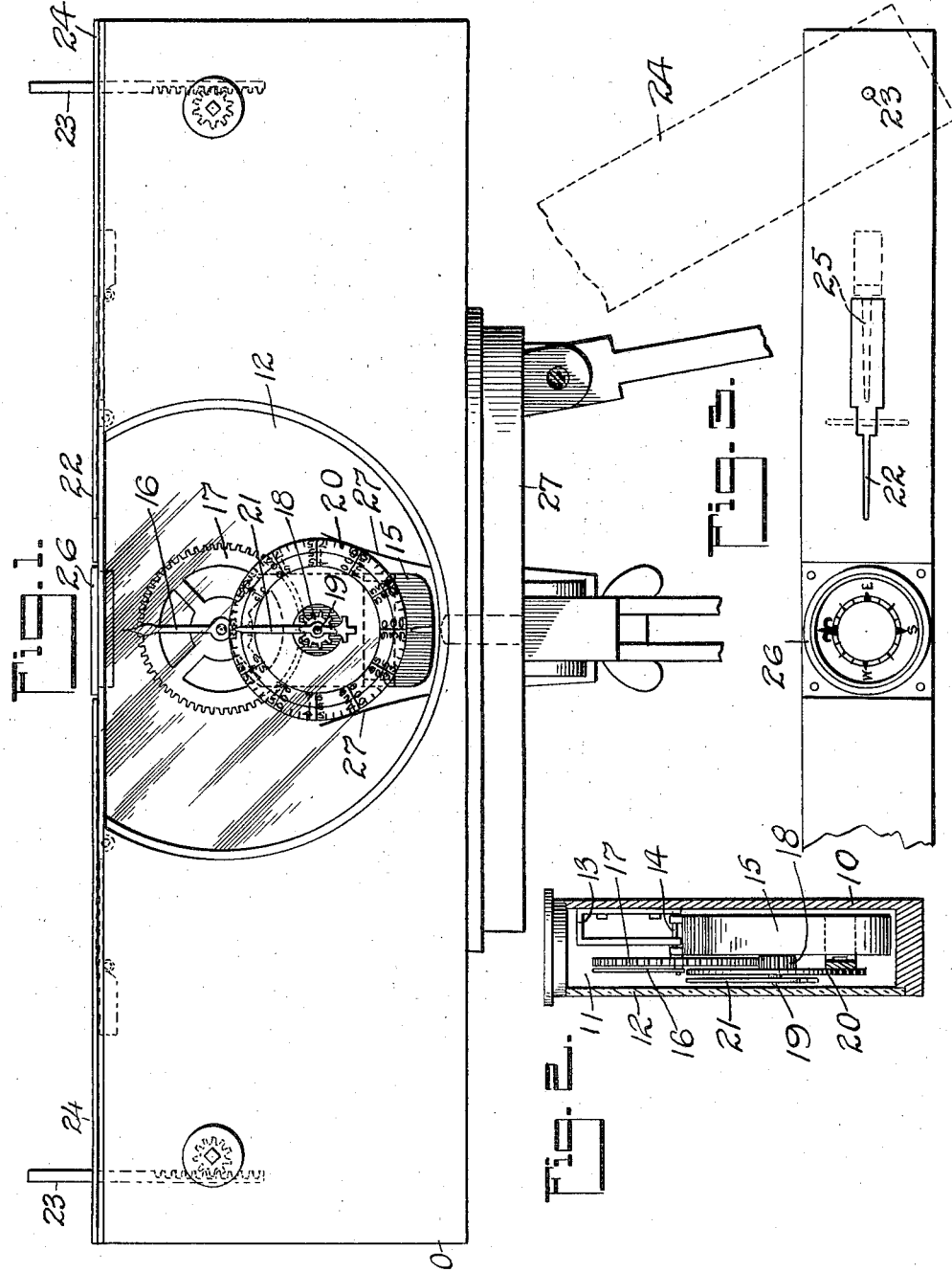

UNITED STATES PATENT OFFICE.

CHARLES HILL, OF MULLAN, IDAHO.

LEVEL.

1,032,904.  Specification of Letters Patent.   Patented July 16, 1912.

Application filed April 15, 1910. Serial No. 555,757.

*To all whom it may concern:*

Be it known that I, CHARLES HILL, a citizen of the United States of America, residing at Mullan, in the county of Shoshone and State of Idaho, have invented new and useful Improvements in Levels, of which the following is a specification.

This invention relates to levels and its object is to provide a cheap and simple device which may be used to determine the irregularities in land and horizontal lines between certain points, as will be more fully described in the following specification, set forth in the claims and illustrated in the accompanying drawings, where:

Figure 1 is a side elevation of the level mounted on a tripod. Fig. 2 is a cross sectional view through same. Fig. 3 is a plan view. Figs. 4, 5 and 6 are views of a modified form of the device.

The casing 10 of the level consists of a block of wood having a central recess 11 covered with a glass plate 12. Within the recess 11 and affixed to the rear wall of the same is a bracket 13 carrying a shaft 14 on which is hung a weight 15, free to swing within the recess 11 and concentric with the walls of same, and carried at the outer end of the shaft 14 is a hand 16 which rotates with it as the weight swings in the recess to indicate the degree that the device departs from the horizontal.

Secured to the bracket 13 is a toothed wheel or segment 17 in the teeth of which mesh the teeth of a pinion 18 journaled on a stud 19 carried by the weight 15 and this pinion is free to rotate thereon when the weight changes its position and the fixed tooth wheel causes the pinion 18 to rotate. Carried by the weight 15 is a dial 20 on which are marked the degrees of a circle and over this dial sweeps a hand 21 secured to the pinion 18 so that great delicacy is secured in the registering of the instrument, as it is very evident that in consequence of the pinion 18 being very much smaller than the wheel 17 its movement around same will greatly multiply the rotation of the hand 21 as compared with the movement of the weight and pinion about the center of wheel 17.

The upper face of the level is at each end provided with the sight points 22 and 23 both of which are connected with plates 24 and are swung around into the positions shown in dotted lines when it is desired to allow the point 22 to drop into a vertical position. Immediately beneath each plate 24 is a third sight point 25 shown in dotted lines which is also permitted to swing on its pivot to assume a vertical position with respect to the surface upon which the level is mounted when either of the plates 24 are turned outward on their pivots 23. These three sights may then be used in laying out certain lines and locating various points and it is obvious that similar points may be arranged on the other end of the casing.

On the top of the instrument is also provided a compass 26 which is a necessary adjunct in this class of instruments and the whole may be mounted on a tripod 27 or otherwise arranged as may be desired. At each side of the disk 20 may be arranged friction springs 27 to prevent rapid rotation of same when the position of the instrument is suddenly changed.

In the modification shown in Figs. 4, 5 and 6 it will be seen that the pinion 28 is mounted on the shaft 29 from which is hung the weight 30 and a gear wheel 31 is secured to a bracket 32 at one side of the weight and meshes with the pinion 31' as the weight 30 moves on its shaft. The pinion 31' has secured to it the gear wheel 28' meshing with pinion 28, while the hands 35 which are carried by the shaft 29, move with the weight and over the dial 34 to indicate the departure of the casing from the horizontal while in consequence of the multiplication of the gearing effecting the movement of the pinion 28, the hand 33 secures a more delicate reading of the inclination on the dial 34.

It will be seen that it is possible to modify and otherwise arrange the details of this level without departing from the broad and essential features above described.

What I claim as new and desire to secure by Letters Patent is:

1. In a level, the combination with a casing, of a shaft journaled in same and carrying an index hand, a weight on the shaft, a second index hand journaled on the weight, and geared with the first hand, and intermeshing gear wheels connecting the said hands with each other.

2. In a level, the combination with a casing, of a shaft journaled therein, a toothed segment centered on the shaft, a hand on the shaft, a weight hung on the shaft and carrying a pinion meshing with the toothed segment and a hand on the pinion.

3. In a level, the combination with a casing, of a shaft therein, a weight secured to the shaft, a stationary toothed segment, a pinion meshing with the segment and journaled on the weight, a hand secured to the pinion and a dial for the hand and carried by the weight.

4. In a level, the combination with a casing having sight points on its upper side, of a shaft journaled within the casing, a toothed segment secured to the casing, a shaft journaled in same, a weight attached to the shaft, a stud on the weight, a pinion mounted on the stud and meshing with the segment, a hand on the pinion, and a dial for the hand and carried by the weight.

5. In a level, the combination with a casing having a recess, a bracket secured to the interior wall of the recess, a shaft journaled in the bracket and carrying a weight, a hand at the outer end of the shaft, a stationary toothed segment, a stud on the weight, a dial about the stud, a pinion on the stud and meshing with the stationary segment and a hand on the pinion adapted to sweep over the dial.

In testimony whereof I affix my signature in presence of two witnesses.

CHARLES HILL.

Witnesses:
CURT A. MARTIN,
JOHN ANDERSON.